United States Patent
Zeiler

(10) Patent No.: US 6,806,680 B2
(45) Date of Patent: Oct. 19, 2004

(54) PORTABLE BATTERY CHARGER

(75) Inventor: Jeffrey M. Zeiler, Delafield, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

(21) Appl. No.: 09/941,192

(22) Filed: Aug. 28, 2001

(65) Prior Publication Data

US 2002/0024318 A1 Feb. 28, 2002

Related U.S. Application Data

(60) Provisional application No. 60/228,554, filed on Aug. 28, 2000.

(51) Int. Cl.$^7$ ................................................. H02J 7/00
(52) U.S. Cl. ........................................................ 320/107
(58) Field of Search ................................. 320/105, 107

(56) References Cited

U.S. PATENT DOCUMENTS

| | | | |
|---|---|---|---|
| 3,694,729 A | | 9/1972 | Jones .......................... 307/150 |
| 4,288,733 A | | 9/1981 | Bilanceri et al. ........... 320/113 |
| 4,489,242 A | * | 12/1984 | Worst ......................... 307/10.1 |
| 4,641,077 A | | 2/1987 | Pascaloff ..................... 320/113 |
| 4,677,362 A | | 6/1987 | House, II et al. ........... 320/115 |
| 4,703,852 A | | 11/1987 | Verdier ......................... 206/349 |
| 4,721,070 A | * | 1/1988 | Tanaka et al. .................. 123/2 |
| 4,739,242 A | | 4/1988 | McCarty et al. ............. 320/110 |
| 4,751,452 A | | 6/1988 | Kilmer et al. ............... 320/106 |
| 4,768,652 A | | 9/1988 | Fallon ......................... 206/373 |
| 5,039,930 A | * | 8/1991 | Collier et al. ................ 320/105 |
| 5,144,217 A | | 9/1992 | Gardner et al. ............. 320/110 |
| 5,187,422 A | | 2/1993 | Izenbaard et al. ........... 320/110 |
| 5,191,276 A | | 3/1993 | Zainaleain ................... 320/110 |
| 5,256,955 A | | 10/1993 | Tomura et al. .............. 320/110 |
| 5,289,101 A | | 2/1994 | Furuta et al. ............... 320/145 |
| 5,391,972 A | | 2/1995 | Gardner et al. ............. 320/115 |
| 5,396,163 A | | 3/1995 | Nor et al. .................... 320/159 |
| 5,533,843 A | | 7/1996 | Chung ..................... 408/241 R |
| 5,593,509 A | | 1/1997 | Zuppero et al. ............. 136/253 |
| 5,633,574 A | | 5/1997 | Sage ........................... 320/107 |
| 5,635,817 A | * | 6/1997 | Shiska ......................... 320/105 |
| 5,757,163 A | | 5/1998 | Brotto et al. ................ 320/155 |
| 5,903,133 A | | 5/1999 | Amero, Jr. et al. ......... 320/107 |
| 5,905,356 A | | 5/1999 | Wells .......................... 320/101 |
| 5,908,233 A | | 6/1999 | Heskett et al. .............. 362/183 |
| 5,909,101 A | | 6/1999 | Matsumoto et al. ........ 320/110 |
| 5,926,005 A | | 7/1999 | Holcomb et al. ........... 320/113 |
| 5,998,961 A | * | 12/1999 | Brown ........................ 320/105 |
| 6,018,227 A | | 1/2000 | Kumar et al. ............... 320/106 |
| 6,018,231 A | | 1/2000 | Shaver et al. ............... 320/116 |
| 6,027,535 A | | 2/2000 | Eberle et al. ............... 361/690 |
| 6,066,938 A | | 5/2000 | Hyodo et al. ............... 320/114 |
| 6,075,341 A | | 6/2000 | White et al. ................ 320/114 |
| 6,075,347 A | | 6/2000 | Sakakibara ................. 320/150 |
| 6,154,007 A | | 11/2000 | Shaver et al. ............... 320/116 |
| 6,227,160 B1 | * | 5/2001 | Kurihara et al. ......... 123/196 R |
| 6,279,612 B1 | * | 8/2001 | Warth ......................... 137/899 |
| 6,326,765 B1 | * | 12/2001 | Hughes et al. .............. 320/104 |

OTHER PUBLICATIONS

Honda Handheld/Super Quiet Generator and Honda battery tender, http://www.boats.net/generators/.*

* cited by examiner

*Primary Examiner*—Pia Tibbits
(74) *Attorney, Agent, or Firm*—Michael Best & Friedrich LLP

(57) ABSTRACT

A portable battery charger. The portable battery charger is for charging a battery and comprises a housing assembly including a charging port for supporting the battery during charging of the battery, a portable power source supported by the housing assembly, and a charging circuit supported by the housing assembly and electrically connectable between the power source and the battery to supply power from the power source to the battery to charge the battery.

26 Claims, 5 Drawing Sheets

PORTABLE BATTERY CHARGER

RELATED APPLICATION

This application claims the benefit of U.S. Provisional Application No. 60/228,554, filed Aug. 28, 2000.

FIELD OF THE INVENTION

The present invention relates to battery chargers and, more particularly, to a portable battery charger.

BACKGROUND OF THE INVENTION

Generally, a battery charger includes a charger housing and a charging circuit supported by the housing. The charger housing includes a charging port for supporting a battery during charging of the battery. Typically, the charging circuit is electrically connectable to a power source, external to the charger housing, to supply power from the external power source to the battery to charge the battery.

SUMMARY OF THE INVENTION

One problem with typical battery chargers is that a separate external power source, such as AC line power, is required for battery charging. In some remote sites, such an external power source is not always available, or access to the external power source may be limited (insufficient outlets to supply both corded tools and charging devices). As a result, batteries are not chargeable at the remote site but must be taken to a site having such a separate external power source or sufficient access to such power sources.

The present invention provides a portable battery charger which substantially alleviates one or more of the above-described and other problems with typical battery chargers. More particularly, the invention provides a portable battery charger including a portable power source. Therefore, the portable battery charger may be taken to a remote charging site not having an external power source and may be used to charge batteries at the remote charging site.

More particularly, the invention provides a portable battery charger for charging a battery, the charger comprising a housing assembly including a charging port for supporting the battery during charging of the battery, a portable fuel-powered power source supported by the housing assembly, and a charging circuit supported by the housing assembly and electrically connectable between the power source and the battery to supply power from the power source to the battery to charge the battery. Preferably, the housing assembly further includes a carrying handle engageable by an operator to move the charger to and from a charging site.

In one construction, the power source includes a combustion engine operable to generate power to charge the battery. In this construction, the combustion engine may be powered by any type of fuel, such as, for example, gasoline or propane. In another construction, the power source includes a fuel source and another fuel-converting/electricity producing device, such as a thermal-photovoltaic device. In either construction, the power source is preferably a cordless power source operable to supply power to charge the battery without being connected to a separate external power source during charging.

In one construction, the housing assembly includes a power source housing supporting the power source and including a receptacle, and a separate charger housing supporting the charging circuit and providing the charging port. Preferably, the charger housing is removably supportable by the power source housing in the receptacle.

Preferably, the power source includes power source connectors, and the charging circuit includes circuit connectors. In this construction, when the charger housing is supported in the receptacle, the power source connectors are electrically connected with the circuit connectors to electrically connect the power source with the charging circuit.

Preferably, the battery includes battery terminals, and the charging circuit includes charging terminals. When the battery is supported by the charging port, the battery terminals are electrically connected with the charging terminals to electrically connect the battery with the charging circuit.

One independent advantage of the present invention is that the portable battery charger may be taken to a remote charging site not having a separate external power source or having limited access to such a power source and may be used to charge batteries at such a remote charging site.

Other independent features and independent advantages of the present invention will become apparent to those skilled in the art upon review of the following detailed description, claims and drawings.

Figure 1:
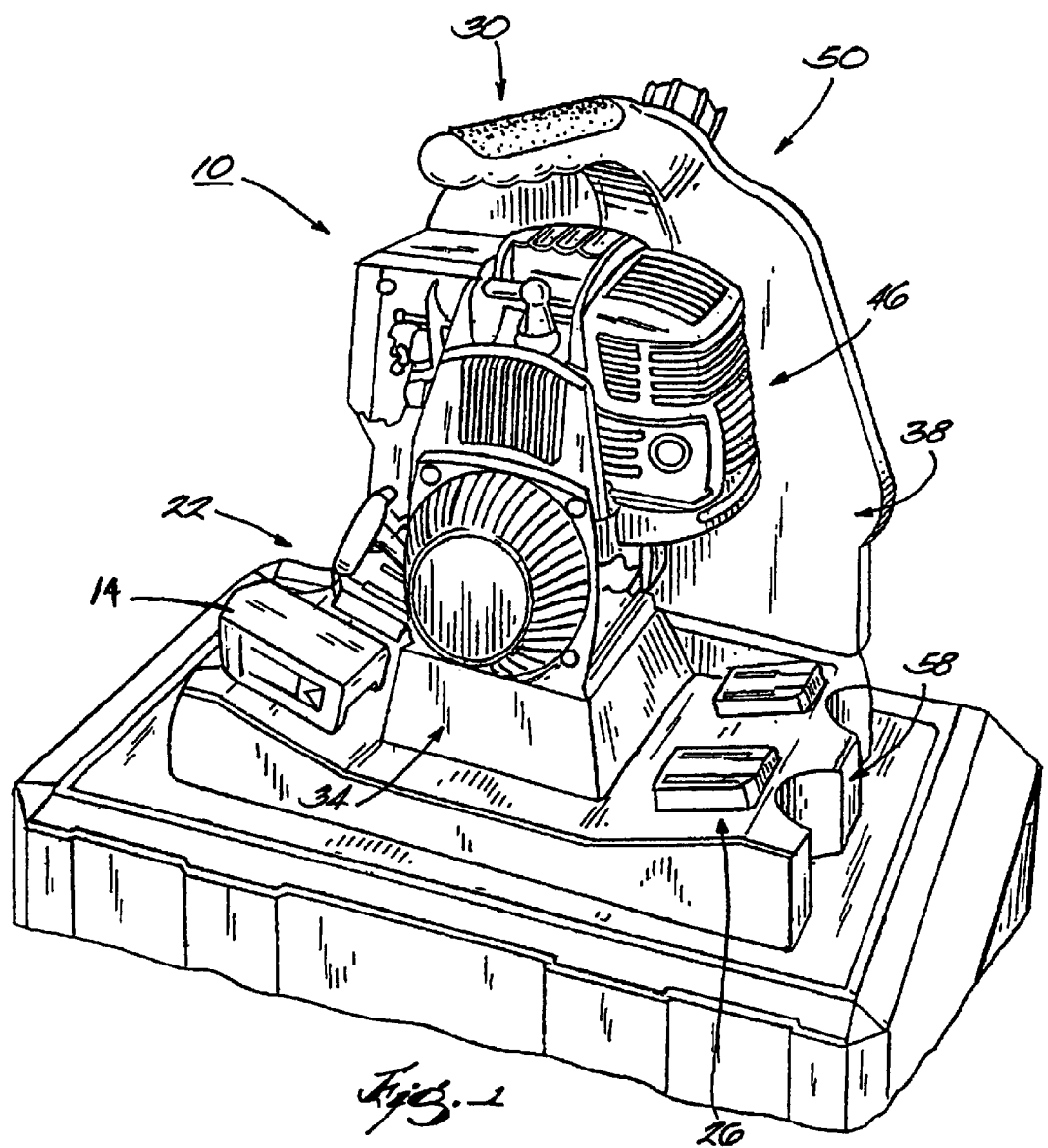
FIG. 1 is a perspective view of a portable battery charger embodying the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or carried out in various ways. Also, it is understood that the phraseology and terminology used herein is for the purpose of description and should not be regarded as limiting.

DETAILED DESCRIPTION OF THE PREFERRED EMBODIMENT

Figure 2:
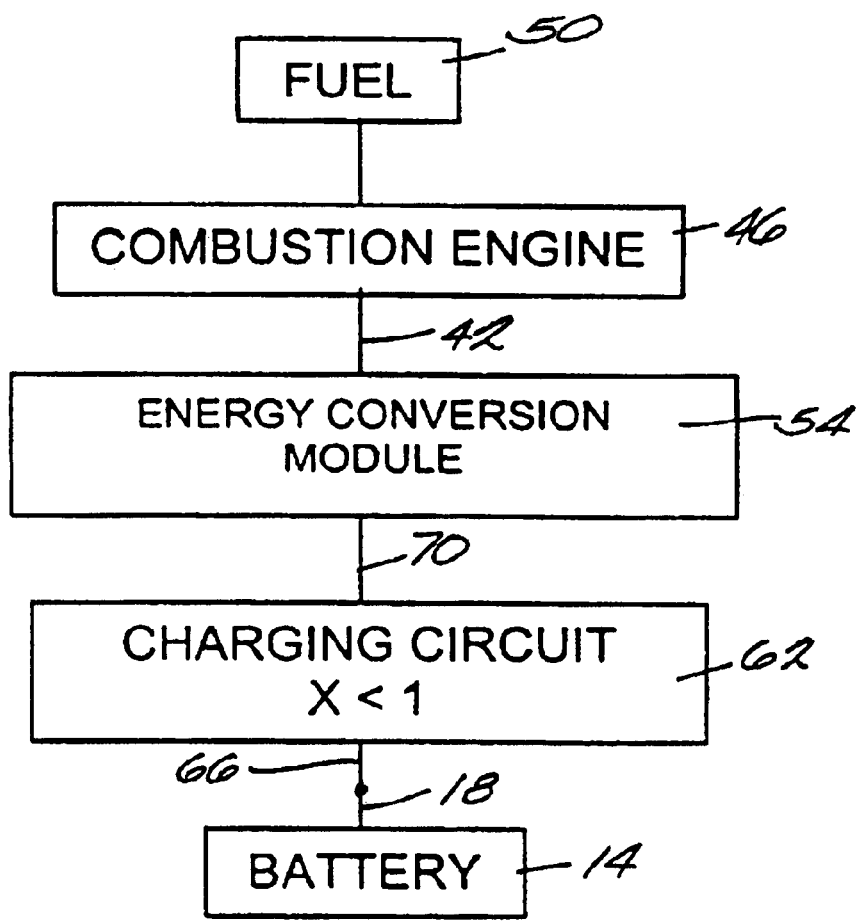
FIG. 2 is a schematic diagram of the portable battery charger shown in FIG. 1.
Figure 3:
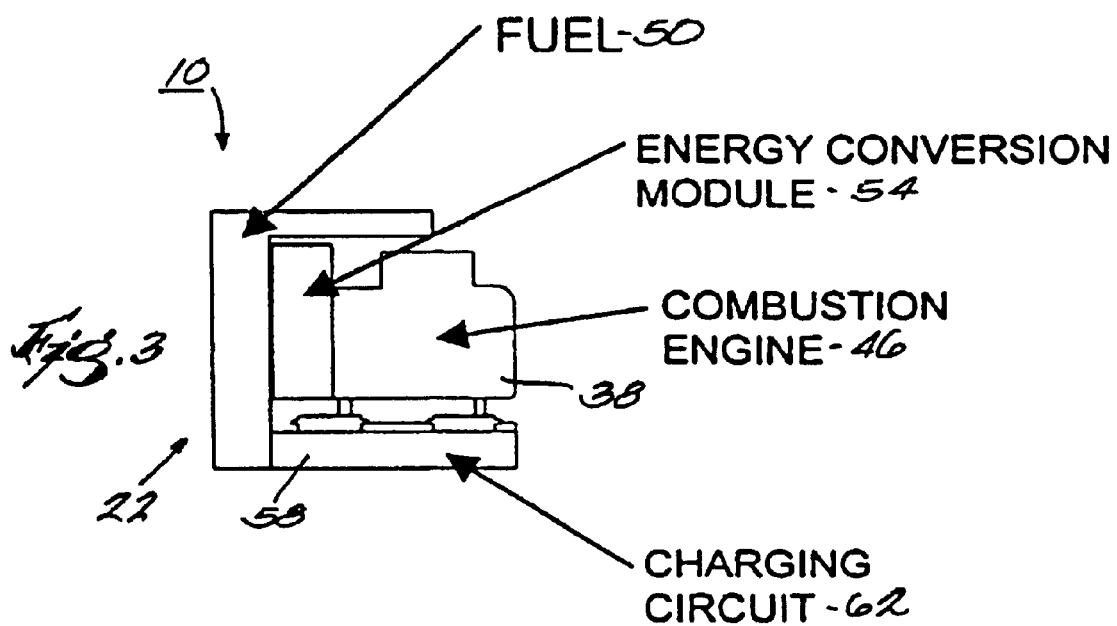
FIG. 3 is a side view of the portable battery charger shown in FIG. 1.
Figure 4:
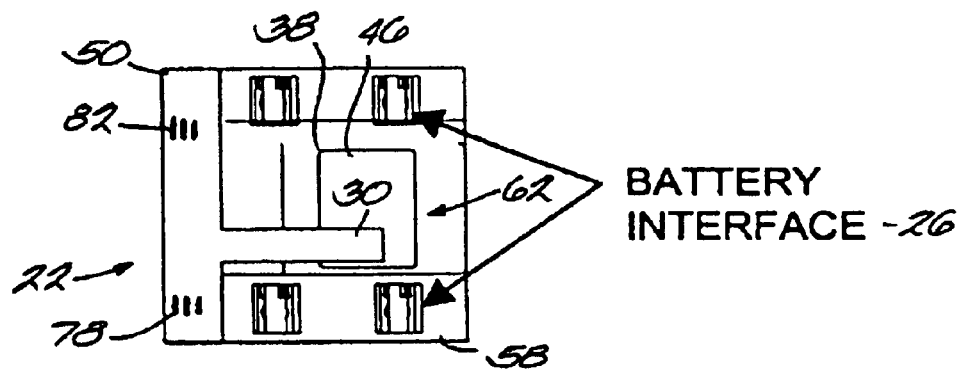
FIG. 4 is a top view of the portable battery charger shown in FIG. 1.

A portable battery charger 10 embodying the invention is illustrated in FIGS. 1–2. The battery charger 10 is operable to charge one or more batteries, such as a power tool battery 14. Each battery 14 to be charged includes a battery terminal assembly 18.

As shown in FIG. 1, the battery charger 10 includes a housing assembly 22 having at least one battery interface or charging port 26 for supporting a battery 14 during charging. The housing assembly 22 also includes a handle portion 30 which is engageable by an operator to move the battery charger 10 as a unit to and from a charging site.

The housing assembly 22 includes a power source housing portion 34 supporting a portable fuel-powered power source 38. The power source 38 includes power source connectors 42 and a power source controller (not shown).

Figure 5:
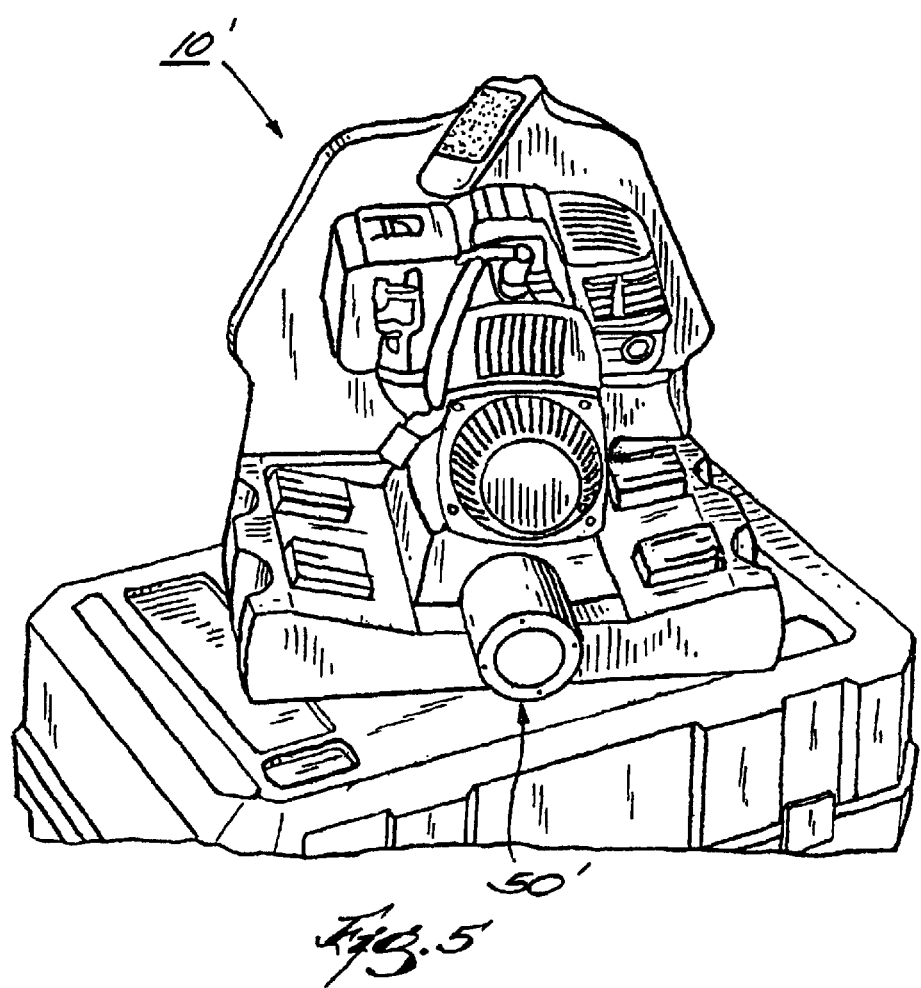
FIG. 5 is a perspective view of an alternative embodiment of the portable battery charger shown in FIG. 1.

In one construction (see FIG. 1), the power source 38 includes a combustion engine 46 operable to generate power to charge the battery 14. The combustion engine 46 may be powered by any type of fuel supply, such as, for example, a gasoline supply 50 (see FIG. 1) or a propane supply 50'(see FIG. 5). The power source 38 also includes an energy conversion module 54 for converting the power generated by the combustion engine 46 into electricity for charging the battery 14. The power source controller automatically shuts down the combustion engine 46 when charging of the battery 14 is completed.

In another construction (not shown), the power source 38 may include another fuel-converting/electricity-producing device, such as a thermal-photovoltaic device. Such a device converts a fuel source, such as, for example, diesel fuel or propane, to photon energy and directs this energy to a photovoltaic array to convert the thermal energy to electricity for use in charging the battery 14.

The housing assembly 22 also includes a charger housing portion 58 supporting a charging circuit 62. The charging circuit 62 is electrically connectable between the power source 38 and the battery 14 to supply power from the power source 38 to the battery 14 to charge the battery 14. The charging circuit 62 includes charging terminals 66 which are electrically connectable to the battery terminal assembly 18 when the battery 14 is supported on the charging port 26. The charging circuit 62 also includes charging connectors 70 which are electrically connectable to the power source connectors 42 to electrically connect the power source 38 to the charging circuit 62.

In one embodiment (see FIGS. 1 and 3–5), the housing assembly 22 is formed as a single housing including both the power source housing portion 34 and the charger housing portion 58.

Figure 6:
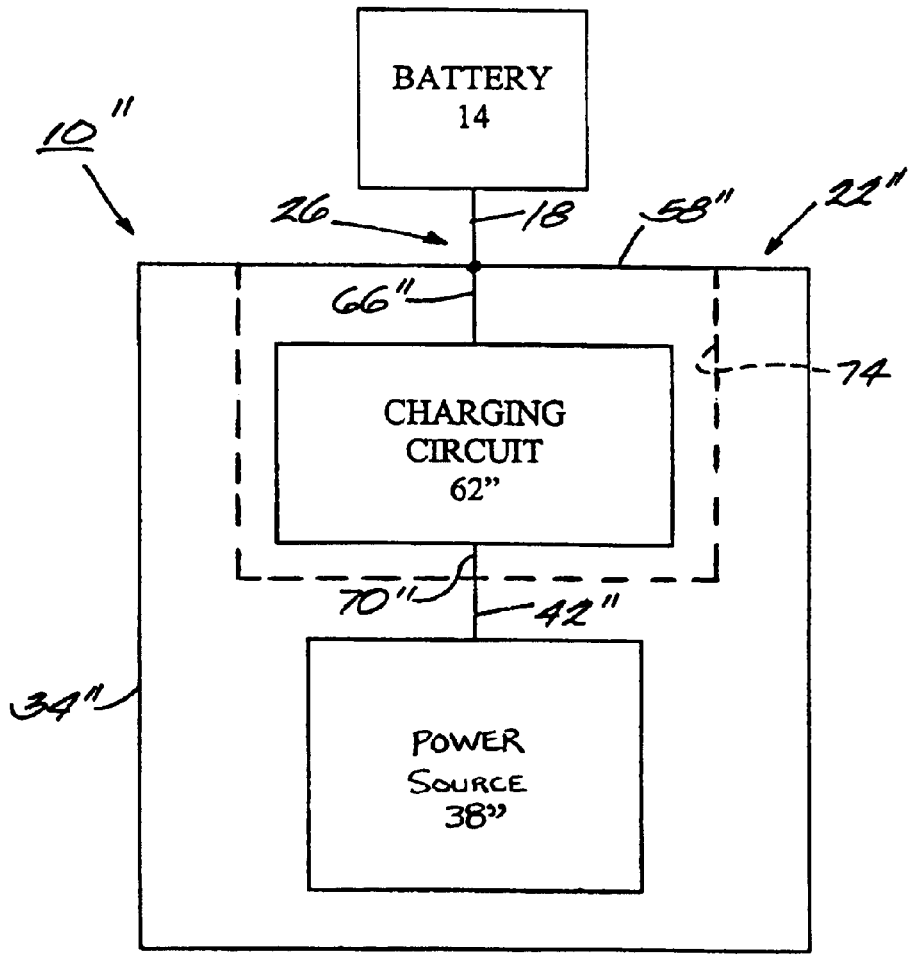
FIG. 6 is a schematic diagram of another alternative embodiment of the portable battery charger shown in FIG. 1.

In another embodiment (see FIG. 6), the housing assembly 22" may include a power source housing portion 34" defining a support portion or a receptacle 74 and a separate charger housing portion 58" which is removably supportable in the receptacle 74. In this embodiment, when the charger housing portion 58" is supported in the receptacle 74, the charging connectors 70" are electrically connected with the power source connectors 42" to electrically connect the charging circuit 62" to the power source 38". In this embodiment, the fuel-powered power source 38" may be replaced with another type of power source (not shown), such as, for example, a rechargeable supply battery (not shown).

An indicator assembly 78 is provided to indicate the status of charging of the battery 14 and the status of the power source 38. The indicator assembly 78 includes several indicators 82, such as, for example, LEDs, to display the status of charging and of the power source 38.

In operation, the battery charger 10 is connected to one or more batteries 14, and the power source 38 supplies power through the charging circuit 62 to the battery 14 to charge the battery 14. In the construction in which the power source 38 includes a combustion engine 46 (see FIGS. 1–5), the combustion engine 46 is operated to supply power to the battery 14. When charging of the battery 14 is completed, the power source controller automatically shuts down the combustion engine 46.

In any of the illustrated constructions, the indicator assembly 78 indicates when charging of the battery 14 is completed and indicates the status of the power source 38.

The battery charger 10 may thus be operated at any charging site, including a remote charging site or a charging site with limited separate external power source access, to charge batteries 14.

Various features of the invention are set forth in the following claims.

I claim:

1. A portable battery charger comprising:
    a housing assembly including a charging port for supporting a battery during charging of the battery;
    a portable power source supported by the housing assembly, the power source including
        a fuel supply, and
        a device operable to convert the fuel to electricity; and
    a charging circuit supported by the housing assembly and electrically connectable between the power source and the battery to supply electricity from the power source to the battery to charge the battery.

2. The charger as set forth in claim 1, wherein the housing assembly further includes a carrying handle engageable by an operator to move the charger to and from a charging site.

3. The charger as set forth in claim 1, wherein the device includes a combustion engine operable to generate electricity to charge the battery.

4. The charger as set forth in claim 1, wherein the fuel supply includes a gasoline fuel supply.

5. The charger as set forth in claim 1, wherein the fuel supply includes a propane fuel supply.

6. The charger as set forth in claim 1, wherein the power source is operable to supply electricity to charge the battery without being connected to an external power source.

7. The charger as set forth in claim 1, wherein the housing assembly includes
    a power source housing supporting the power source and including a receptacle, and
    a charger housing supporting the charging circuit and providing the charging port, the charger housing being removably supportable by the power source housing in the receptacle.

8. The charger as set forth in claim 7, wherein the power source includes power source connectors, wherein the charging circuit includes circuit connectors, and wherein, when the charger housing is supported in the receptacle, the power source connectors are electrically connected with the circuit connectors to electrically connect the power source with the charging circuit.

9. The charger as set forth in claim 1, wherein the battery includes battery terminals, wherein the charging circuit includes charging terminals, and wherein, when the battery is supported by the charging port, the battery terminals are electrically connected with the charging terminals to electrically connect the battery with the charging circuit.

10. A combination comprising;
    a housing including a receptacle;
    a portable power source supported by the housing and operable to supply power to a battery to charge the battery; and
    a battery charger including
        a charger housing supportable in the receptacle, the charger housing including a charging port for supporting the battery, and
        a charging circuit supported by the charger housing and electrically connectable between the power source and the battery to supply power from the power source to the battery to charge the battery.

11. The combination as set forth in claim 10, wherein the housing further includes a carrying handle engageable by an operator to move the combination to and from a charging site.

12. The combination as set forth in claim 10, wherein the power source includes a fuel supply, and a device operable to convert the fuel to electricity.

13. The combination as set forth in claim 10, wherein the power source includes a combustion engine operable to generate electricity to charge the battery.

14. The combination as set forth in claim 10, wherein the power source includes a fuel supply.

15. The combination as set forth in claim 14, wherein the fuel supply includes a gasoline fuel supply.

16. The combination as set forth in claim 14, wherein the fuel supply includes a propane fuel supply.

17. The combination as set forth in claim 10, wherein the power source is operable to supply power to charge the battery without being connected to an external power source.

18. The combination as set forth in claim 10, wherein the power source includes power source connectors, wherein the charging circuit includes circuit connectors, and wherein, when the charger housing is supported in the receptacle, the power source connectors are electrically connected with the circuit connectors to electrically connect the power source with the charging circuit.

19. The combination as set forth in claim 10, wherein the battery includes battery terminals, wherein the charging circuit includes charging terminals, and wherein, when the battery is supported by the charging port, the battery terminals are electrically connected with the charging terminals to electrically connect the battery with the charging circuit.

20. A portable battery charger comprising:
 a housing assembly including a charging port for supporting a battery during charging of the battery;
 a portable power source supported by the housing assembly, the power source including
  a fuel supply, and
  a combustion engine operable to generate electricity; and
 a charging circuit supported by the housing assembly and electrically connectable between the power source and the battery to supply electricity from the power source to the battery to charge the battery.

21. The charger as set forth in claim 20, wherein the housing assembly further includes a carrying handle engageable by an operator to move the charger to and from a charging site.

22. The charger as set forth in claim 20, wherein the fuel supply includes a gasoline fuel supply.

23. The charger as set forth in claim 20, wherein the fuel supply includes a propane fuel supply.

24. The charger as set forth in claim 20, wherein the housing assembly includes
 a power source housing supporting the power source and including a receptacle, and
 a charger housing supporting the charging circuit and providing the charging port, the charger housing being removably supportable by the power source housing in the receptacle.

25. The charger as set forth in claim 24, wherein the power source includes power source connectors, wherein the charging circuit includes circuit connectors, and wherein, when the charger housing is supported in the receptacle, the power source connectors are electrically connected with the circuit connectors to electrically connect the power source with the charging circuit.

26. The charger as set forth in claim 20, wherein the battery includes battery terminals, wherein the charging circuit includes charging terminals, and wherein, when the battery is supported by the charging port, the battery terminals are electrically connected with the charging terminals to electrically connect the battery with the charging circuit.

* * * * *